United States Patent
Oehme (10) Patent No.: US 11,911,758 B2
(45) Date of Patent: Feb. 27, 2024

(54) METHOD FOR DETERMINING THE CONSUMPTION OF AT LEAST ONE SUBSTANCE

(71) Applicant: Analytik Jena AG, Jena (DE)

(72) Inventor: Heiko Oehme, Jena (DE)

(73) Assignee: Analytik Jena GmbH+Co. KG, Jena (DE)

( * ) Notice: Subject to any disclaimer, the term of this patent is extended or adjusted under 35 U.S.C. 154(b) by 987 days.

(21) Appl. No.: 16/850,466

(22) Filed: Apr. 16, 2020

(65) Prior Publication Data

US 2020/0376481 A1  Dec. 3, 2020

(30) Foreign Application Priority Data

Apr. 17, 2019  (DE) .................. 10 2019 110 094.1

(51) Int. Cl.
*B01L 3/02*  (2006.01)
*G01N 35/10*  (2006.01)

(52) U.S. Cl.
CPC ........ *B01L 3/0237* (2013.01); *G01N 35/1011* (2013.01); *G01N 2035/1048* (2013.01)

(58) Field of Classification Search
CPC ........ G01N 35/1011; G01N 2035/1048; B01L 3/0237; B01L 2200/148; G01F 22/00
USPC .......................................................... 702/23
See application file for complete search history.

(56) References Cited

U.S. PATENT DOCUMENTS 9,086,396 B2 * 7/2015 Burkard ............. G01N 35/1011

\* cited by examiner

*Primary Examiner* — John H Le
(74) *Attorney, Agent, or Firm* — Mark A. Logan; Endress+Hauser (USA) Holding, Inc.

(57) ABSTRACT

Disclosed is a method for determining a starting amount of a first substance which is required for providing a predeterminable number of samples in a liquid handling process. Also disclosed is a corresponding computer program and a corresponding computer program product. The liquid handling process is described through at least one work step, taking into account at least one secondary condition. An estimated value for the starting amount of the first substance is determined. A simulation of the at least one work step is then performed. A new estimated value for the starting amount is determined and the simulation is repeated if the prior simulation could not be completed or an actual value ascertained in the simulation deviates from the estimated value by more than a predeterminable tolerance. Otherwise, the actual value ascertained on the basis of the simulation is the starting amount of the first substance.

15 Claims, 6 Drawing Sheets

METHOD FOR DETERMINING THE CONSUMPTION OF AT LEAST ONE SUBSTANCE

CROSS-REFERENCE TO RELATED APPLICATION

The present application is related to and claims the priority benefit of German Patent Application No. 10 2019 110 094.1, filed on Apr. 17, 2019, the entire contents of which are incorporated herein by reference.

TECHNICAL FIELD

The present disclosure relates to a method, especially, a computer-implemented method, for determining at least one first starting amount of a first substance which is required for providing a predeterminable number of samples in a liquid handling process, to a corresponding computer program, and to a corresponding computer program product.

BACKGROUND

Liquid handling generally relates to the handling of liquids in a laboratory, for example in a chemical, biochemical, or biological laboratory. In connection with liquid handling, many different devices, especially, pipetting tools or dispensers, are available in various embodiments. In addition, liquid handling systems and liquid handling robots have also become known, which are used especially at high sample volumes or for repetitive pipetting processes and enable high precision and accuracy.

Especially in the automated processing of liquid handling processes (liquid handling workflows), the consumption of the respectively used substances and components, for example samples, reagents, or labware, is usually determined in advance in order to be able to ensure correct processing of the work steps of the respective process. On the one hand, sufficient amounts of the substances and components have to be provided for the respective process. On the other hand, however, they are often costly materials and/or materials with limited availability so that the most economical possible handling of the respective materials is desired or necessary.

In the field of operation research, a distinction is made, for example, between article-oriented and amount-oriented approaches for calculating the material consumption in a wide variety of processes and applications. In addition, mixed, especially, heuristic, approaches have also become known which inter alia take into account the consumption of auxiliary substances in article-oriented or amount-oriented production.

However, such approaches for determining consumptions can only be transferred very conditionally into the laboratory area, especially, into the area of liquid handling processes. This is due to a variety of reasons: On the one hand, as already stated, the prediction should be as accurate as possible due to the nature of the substances typically used. This also implies that the consumption should be planned as optimally as possible with regard to amounts.

A further problem can be seen in the fact that the respective processes depend on a wide variety of influencing factors. Especially in the case of multistage processes which comprise a plurality of work steps, exact consumption calculation is thus very difficult to implement and/or comparatively complex.

Typical influencing factors are, for example, minimum or maximum volume of the respectively used reservoirs or vessels, minimum or maximum working volume of the pipetting tools used, especially, the pipette tips used, blow-out volume of the pipetting tools used, specifications regarding the sequence of work steps to be performed, predetermined arrangements of the samples, for example when using microtiter plates, specifications from the respectively used pipetting tools, especially, the respective number of pipetting channels, or from the respectively used pipetting methods including their parameters, for example the single-dispensing, the multi-dispensing, or also the multi-aspirate method.

In addition, in the field of liquid handling, various boundary conditions must be taken into account, which likewise have an effect on the prediction or on the determination of a consumption. For example, it must be taken into account that a transfer of a specific partial amount of a substance from a first into a second vessel takes place in each case in a single work step.

The use of a correction factor is established in practice. In this case, the consumption amounts linearly extrapolated to the respective number of samples are assumed. The definition of a suitable correction factor is, however, highly dependent on the individual experience of the respective worker. In addition, the respectively suitable correction factor is highly dependent on the respective process conditions, process requirements as well as on the labware used and the pipetting tools used.

SUMMARY

Proceeding therefrom, the object of the present disclosure is to provide a method for calculating the consumption of substances in liquid handling processes, by means of which consumptions can be determined in the simplest and most reliable manner possible.

This object is achieved by the method according to claim 1, the computer program according to claim 15, and the computer program product according to claim 16.

With regard to the method, the object on which the disclosure is based is achieved by a method, especially, a computer-implemented method, for determining at least one first starting amount of a first substance which is required for providing a predeterminable number of samples in a liquid handling process. The method comprises the following method steps:

Describing the liquid handling process through at least one first work step,

Taking into account at least one secondary condition for the at least one work step, Determining an estimated value for the first starting amount of the first substance which is required for providing the predeterminable number of samples, Performing a simulation of at least the first work step of the liquid handling process on the basis of the estimated value for the first starting amount of the first substance and the at least one secondary condition, and Determining a new estimated value for the first starting amount of the first substance and re-performing the simulation of at least the first work step on the basis of the new estimated value if the simulation cannot be completed, or if a deviation of an actual value ascertained on the basis of the simulation for the first starting amount of the first substance from the estimated value for the first starting amount of the first substance falls below or exceeds a predeterminable tolerance range, or Outputting the actual value ascertained on the basis of the simulation as the first starting amount of the first substance.

The present disclosure is based on simulating the liquid handling process to be performed in each case for the purpose of determining consumption. For this purpose, an estimated value for the consumption of at least one first substance is determined, and the respective process is carried out in a simulation taking into account at least one secondary condition. Based on the result of the simulation, at least the first starting amount of the first substance is varied iteratively and the simulation is repeated on the basis of the respectively newly defined estimated values until a sufficiently accurate value for the consumption of at least the first substance has been ascertained.

This procedure is based on the fact that many secondary conditions of the respective liquid handling process are known per se. Secondary conditions in the context of the present disclosure include, for example, both the influencing factors mentioned in the introduction and the boundary conditions. Many secondary conditions are indicated, for example, in workflow descriptions, labware libraries, and liquid classes and can be taken into account for predicting the consumption at least for the first substance. Labware libraries contain, for example, information on the geometry as well as further properties of reservoirs or containers and pipette tips, while especially machine-relevant parameters of the liquids to be pipetted are stored in the liquid classes.

The present disclosure makes it possible to ascertain and optimize the expected consumption of the substances used based on a predeterminable number of samples and based on a liquid handling process to be carried out for these samples. Advantageously, this method can be used universally for a wide variety of liquid handling processes. Known parameters and specifications relating to the manner in which individual work steps are to be carried out can be taken into account in a simple manner so that in order to ascertain a consumption, it is no longer necessary to rely on many years of experience of a user, such as when determining consumption on the basis of a correction factor.

The respective liquid handling process can consist of one or more work steps. Some exemplary possible work steps of a liquid handling process are indicated below:

It is advantageous if a first work step comprises a transfer of a first partial amount of the first substance from at least one first reservoir into at least one intermediate reservoir or into a sample container for receiving one of the samples.

It is furthermore advantageous if a second work step comprises a transfer of a second partial amount of a second substance from at least one second reservoir into at least one intermediate reservoir or into a sample container for receiving one of the samples, wherein a second starting amount of the second substance which is required for providing the predeterminable number of samples is determined.

The determination of the second starting amount can take place in parallel to the determination of the first starting amount. In this case, in each case, an estimated value for each starting amount of each substance used is determined, and the simulation of the complete process is performed on the basis of the estimated values. The method according to the present disclosure can thus simultaneously determine and in each case optimize a plurality of starting amounts of different substances necessary for the respective liquid handling process.

It is furthermore advantageous if a third work step includes a transfer of a first partial amount of a first substance and a transfer of a second partial amount of a second substance from at least one first and at least one second reservoir for producing a first intermediate into at least one first intermediate reservoir, and wherein a first and/or second starting amount of the first and/or second substance for producing a predeterminable amount of the intermediate and/or a first and/or second starting amount of the first and/or second substance which is required for providing the predeterminable number of samples is determined.

It is also advantageous if a fourth work step comprises a transfer of a partial amount of the first intermediate from the at least one first intermediate reservoir into at least one further intermediate reservoir or a sample container for receiving one of the samples.

Finally, it is also advantageous if a first starting amount of the first intermediate which is required for providing the predeterminable number of samples is ascertained.

Accordingly, the method according to the present disclosure furthermore allows the consumptions of intermediates in multistage processes to be ascertained. In this case, both the respectively necessary starting amounts of the respective substances and the starting amounts of the intermediates which are necessary for providing the respective samples can be ascertained and optimized.

It goes without saying that the possible work steps mentioned here can be combinable with one another as desired, that individual work steps can occur several times in the same liquid handling process at different times, and that, in addition to the work steps mentioned here, a plurality of further work steps can be included which likewise fall under the present disclosure.

A further embodiment of the present disclosure includes performing at least one transfer of at least one substance or of at least one intermediate by means of a pipetting process with at least one pipetting tool.

In this context, a wide variety of pipetting tools can be used. For example, the pipetting tool can be designed to receive, especially, releasably, at least one pipette tip. However, fixed pipette tips or cannula-like liquid transfer devices, such as needles, can also be provided.

Furthermore, the pipetting tool can have a pipetting channel or a plurality of pipetting channels. In the case of a plurality of pipetting channels, it is also possible for the individual channels to be arranged next to one another or in a two-dimensional matrix, wherein the number of the pipetting channels in the rows and columns of the matrix can be both the same and different. Especially for single-column or single-row arrangements, the individual pipetting channels can moreover be arranged at least partially equidistantly or non-equidistantly and/or be movable relative to one another.

The pipetting tool can also be designed such that the individual pipetting channels can be moved individually, especially, independently of one another, especially, lowerably in the direction of the reservoir or intermediate reservoir.

Furthermore, the reservoirs, intermediate reservoirs, and/or sample carriers can be designed differently for receiving the samples. The reservoirs, intermediate reservoirs, and/or sample carriers can especially be dimensioned such that a predeterminable partial amount of the respective substance can be transferred simultaneously for each pipetting channel by means of a multi-channel pipetting tool.

The pipetting process itself can be carried out using any pipetting method known from the prior art. For example, the pipetting method used can be the so-called single-dispensing, multi-dispensing, or multi-aspirate method.

An advantageous embodiment of the method according to the present disclosure includes selecting the number of pipetting channels of the pipetting tool as a function of the number of samples to be produced. The number of pipetting channels is preferably selected such that residual volumes remaining in a reservoir or intermediate reservoir are as low as possible in each case. Additionally or alternatively, it is possible to select reservoirs, intermediate reservoirs, and/or sample carriers, especially, with regard to their dimensions, for example the respective volumes, as a function of the number of samples to be produced.

A further advantageous embodiment of the method according to the present disclosure includes ascertaining a number of pipette tips which are required for providing the predeterminable number of samples. In this way, in addition to the consumption of the respective substances, the consumption of the pipette tips can also be determined and optimized.

Yet another embodiment includes returning at least a partial amount of at least one substance or one intermediate in the form of a blowout volume into the respective reservoir or intermediate reservoir for the respective substance or the respective intermediate during a pipetting process. Alternatively, it is possible for the at least one partial amount of the substance or the intermediate to be discharged into a waste container. In each case, the partial amount of the substance or the intermediate is taken into account when ascertaining the estimated value for the respective starting amount of the substance or the intermediate.

The at least one secondary condition of the at least one work step is advantageously a dead volume, a residual volume, or a maximum volume of a reservoir, an intermediate reservoir, and/or a container, a parameter of at least one pipetting tool used, especially, a minimum or maximum working volume of a pipette tip or a blowout volume, a parameter of at least one pipetting method used, a specification with regard to a mechanical working range of at least one pipetting tool used, or information regarding an arrangement and/or number of the samples.

In this context, it is advantageous if at least one secondary condition, especially, a dead volume, a residual volume, or a maximum volume of a reservoir, an intermediate reservoir, and/or a container, is taken into account for at least one work step of the liquid handling process which comprises a transfer of a substance or an intermediate. If the transfer is effected by a pipetting process, it is furthermore advantageous if a pipetting method to be used for the work step which comprises the transfer is defined, and if at least one secondary condition, especially, a minimum or maximum working volume or a blowout volume of the respective pipette tip or another parameter of the pipetting method used, is taken into account for this pipetting process.

A plurality of different secondary conditions may be considered in the case of the information regarding an arrangement and/or number of the samples. For example, a secondary condition can include information about the dimensioning and/or nature of a reservoir, intermediate reservoir, and/or sample carrier. With regard to the dimensioning or geometry of the respective reservoir and intermediate reservoir, it is furthermore especially of interest how individual pipetting channels of a pipetting tool used can be assigned. However, the dimensioning of the respective sample carrier, for example of a microtiter plate, in relation to the pipetting tool is also important.

With regard to the pipetting tool, possible secondary conditions are furthermore given by the dimensioning and/or nature of a container used for the pipette tips. This information can be used to assign the pipette tips to the individual pipetting channels of the pipetting tool.

With regard to the at least one estimated value for the first starting amount of the first substance which is required for providing the predeterminable number of samples, it is advantageous if the estimated value is ascertained as a function of the number of predeterminable samples, the number of work steps of the liquid handling process, on the basis of at least one secondary condition of at least one work step, preferably on the basis of all relevant known secondary conditions of each work step, and/or on the basis of the number of reservoirs, intermediate reservoirs, and/or sample carriers used.

Thus, a preferred embodiment with regard to the at least one estimated value provides that the estimated value for the first starting amount of the first substance which is required for providing the predeterminable number of samples is ascertained taking into account a correction factor. Alternatively, it is also advantageous if the estimated value is ascertained taking into account at least one dead, residual, or maximum volume of at least one reservoir, intermediate reservoir, and/or container used.

A further preferred embodiment includes ascertaining, in the event that a simulation cannot be completed, for which substance and/or for which intermediate too small a starting amount of a substance or an intermediate available was provided. The fact that the simulation cannot be completed therefore means that the predeterminable number of samples has not been reached, that is to say that the estimated values for the starting amounts of the respectively used substances and/or intermediates were not sufficient.

In this respect, it is advantageous if the new estimated value for the starting amount in the respective reservoir or intermediate reservoir is increased for the substance and/or for the intermediate for which too small a starting amount was provided, and/or if a further reservoir and/or intermediate reservoir with the substance and/or the intermediate is provided. A further reservoir and/or intermediate reservoir comes into consideration especially if an already existing reservoir and/or intermediate reservoir was already completely or almost completely filled on the basis of the estimated value for the respective starting amount. A starting amount which is too small/too high for a substance and/or for an intermediate is present if the respective difference between the estimated value and the actual value lies outside the predeterminable tolerance range.

Yet another preferred embodiment of the method includes reducing/increasing the estimated value for the starting amount of the substance and/or of the intermediate in the event that an actual value ascertained by means of a simulation for a starting amount of a substance and/or an intermediate is less/greater than the respective estimated value for the starting amount of the substance and/or the intermediate. The consumption can be optimized by this measure. The estimated value for the starting amount of the substance and/or the intermediate is especially varied until a deviation of the respective actual value from the respective estimated value lies within a predeterminable tolerance range, i.e., does not fall below or exceed this tolerance range.

The object on which the present disclosure is based is furthermore achieved by a computer program for determining at least one first starting amount of a first substance which is required for providing a predeterminable number of samples in a liquid handling process, with computer-readable program code elements which, when executed on a computer, cause the computer to carry out an embodiment of the method according to the present disclosure.

The object on which the present disclosure is based is also achieved by a computer program product with a computer program according to the present disclosure and at least one computer-readable medium on which at least the computer program is at least partially stored.

It is pointed out that the embodiments described in connection with the method according to the present disclosure can also be applied mutatis mutandis to the computer program according to the present disclosure and to the computer program product according to the present disclosure and vice versa.

BRIEF DESCRIPTION OF THE DRAWINGS

The present disclosure is explained in greater detail with reference to the following figures. These show:

FIG. 1 shows a schematic depiction of a work step of a liquid handling process;

FIG. 3 shows a first embodiment of the method according to the present disclosure with regard to a first liquid handling process;

FIG. 4 shows a second embodiment of the method according to the present disclosure with regard to a second liquid handling process.

FIG. 5 shows a third embodiment of the method according to the present disclosure with regard to a third liquid handling process.

In the figures, identical elements are each provided with the same reference symbols.

DETAILED DESCRIPTION

Figure 1A:
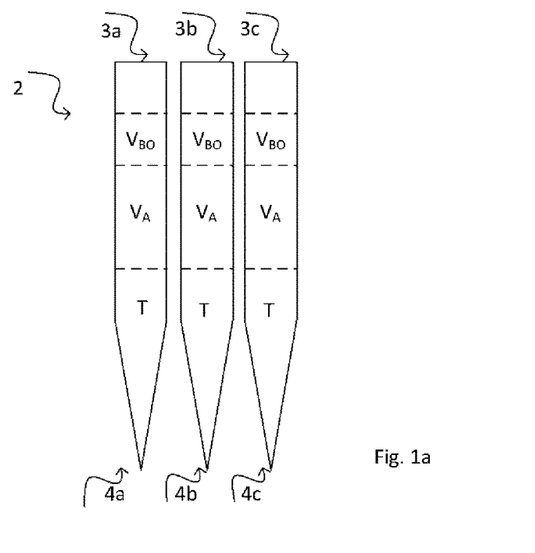
FIG. 1a shows schematically a pipetting tool used in the liquid handling process.
Figure 1B:
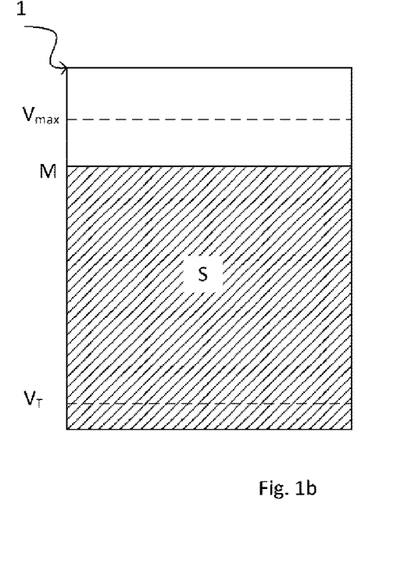
FIG. 1b shows schematically a reservoir used in the liquid handling process.
Figure 1C:
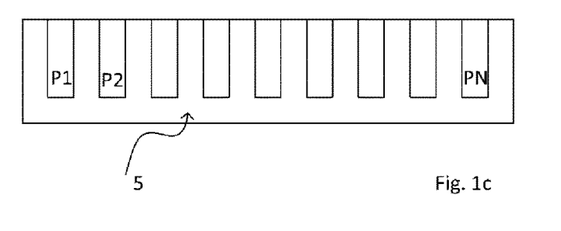
FIG. 1c shows schematically sample containers used in the liquid handling process.

FIG. 1 illustrates a work step A of a liquid handling process. A starting amount M of a substance S is contained in a reservoir 1. The reservoir 1 has a dead volume VT and a maximum volume Vmax. These two volumes represent relevant secondary conditions N1 and N2 for the liquid handling process.

The dead volume VT is a volume which cannot be used/processed due to the geometry of the reservoir 1 containing the substance S or other process-related causes. Thus, for example, in the case of a flat bottom surface of the reservoir 1, the entire amount M of the substance S contained cannot readily be received by a pipetting tool 2. Rather, a portion of the substance S will always remain in the reservoir 1 due to adhesion and other physical effects, for example.

The maximum volume Vmax in turn indicates the maximum capacity of the reservoir 1. If a larger amount M of the respective substance S is required for a process, a plurality of reservoirs 1 must be used, for example.

In the work step A shown, a partial amount T of the substance S is to be transferred into each of the sample containers P1-PN, which are all arranged on a sample carrier 5. The sample carrier 5 is, for example, a microtiter plate. However, it is in no way imperative that all samples are arranged on a single sample carrier 5. The samples can, for example, also each be arranged separately from one another in different containers.

The transfer of the partial amounts T of the substance S for providing the individual samples P1-PN takes place by means of the pipetting tool 2. The pipetting tool 2 has three pipetting channels 3a-3c with three pipette tips 4a-4c. The working volume Va and the blowout volume VBO, for example, can be considered as secondary conditions N3 and N4 for the pipetting tool 2.

The working volume Va is a measure for the fluid that can be received in each pipetting channel. On the other hand, a partial step of a pipetting process in which an additional volume is dispensed at the completion of a pipetting process is referred to as blowout. The dispensing can take place into a reservoir 1 or into a waste container [not shown]. The dispensed volume, which is referred to as blowout volume VBO, can consist of both the substance S and of air. After a blowout has been performed, no more substance S is present in the pipette tip.

A wide variety of pipetting methods can be used to transfer the substance S. For example, the pipetting process can be performed by means of what is called the single-dispensing method. In this method, a predetermined volume of a liquid is transferred with the aid of a pipette from a reservoir 1 into a target container [for example P1-PN here]. For this purpose, the volume to be transferred, a partial amount T of the substance S, is first received in the reservoir 1 by the pipette. This partial amount T is then dispensed again by the pipette into the target container P. A blowout can take place in addition to this dispensing.

In the multi-dispensing method, on the other hand, a multiple of the partial amount T of the substance S can be received from the reservoir 1 by a pipette or a pipetting channel of a pipetting tool and transferred into the respective target container P1-PN. A fixed volume is typically received in addition to the volume to be transferred. The cycle of receiving and dispensing a multiple of the partial amount T to be transferred can be repeated several times, wherein no further fixed volume has to be received for the repetitions. At the end of the transfer, the fixed volume can either be dispensed within the framework of a blowout back into the reservoir 1 or into a waste container.

In the multi-aspirate method, in turn, partial amounts T are successively received from different reservoirs 1 and then dispensed together into a single target container P. The different partial amounts T can be different substances S. It is optionally possible to receive air in each case between the receiving of two different partial amounts T in order to separate each of the different substances S. At the end of a transfer, a blowout can also be additionally performed in this case.

As already explained, in the field of liquid handling, the substances used are often costly and/or only available to a limited extent. Due to inter alia the numerous secondary conditions likewise already described, an accurate prediction of the consumption of the individual substances S is generally a complex endeavor in which the achievable accuracy frequently depends not least on the experience of the respective user. This problem is addressed by the present disclosure by providing a method for predicting the consumption of at least one substance. Using the method according to the present disclosure, consumptions can be predicted with high accuracy in an amount-optimized manner independently of the respective method.

Figure 2:
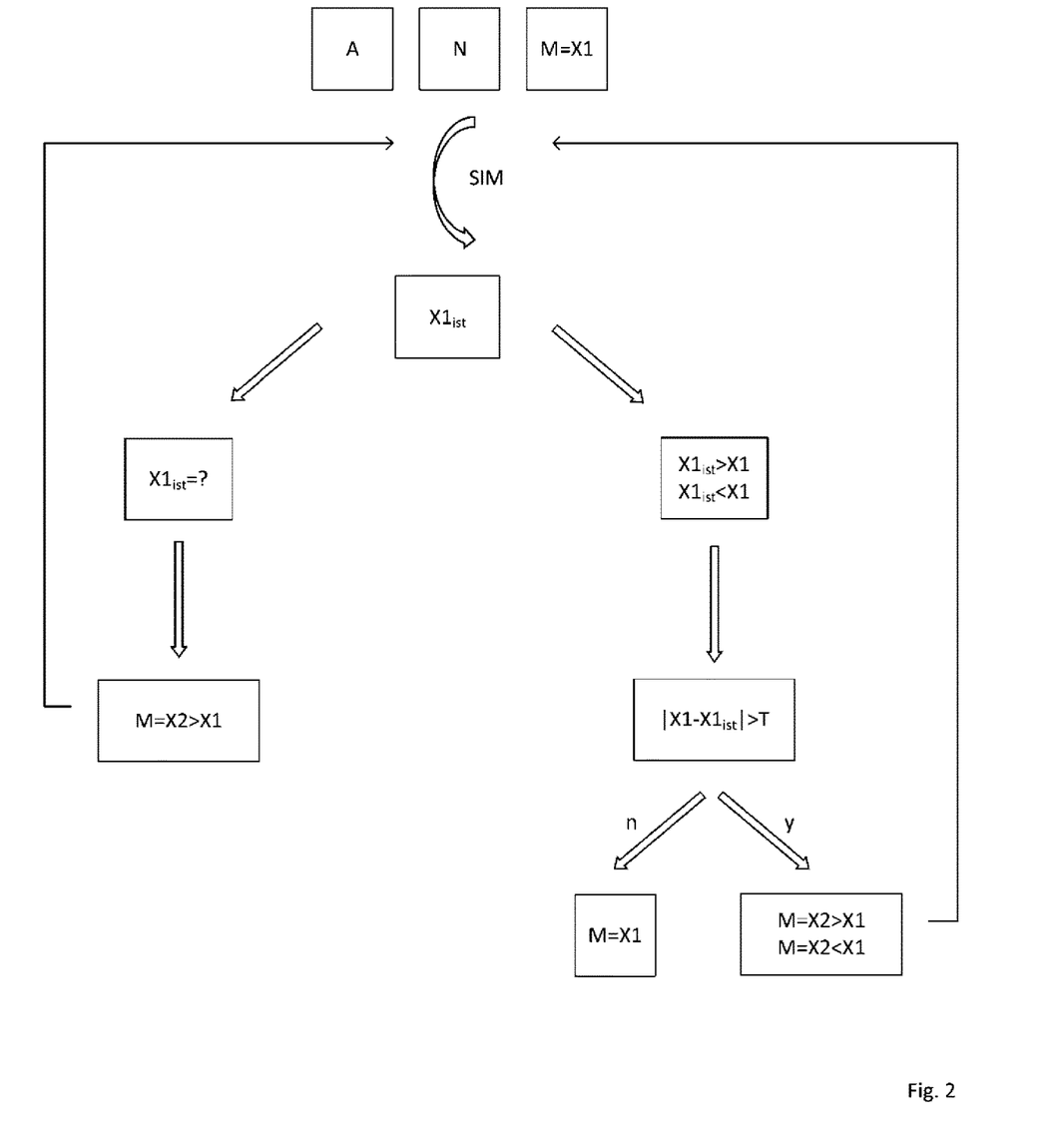
FIG. 2 shows a schematic flow chart for the method according to the present disclosure.

A typical method sequence is schematically outlined in FIG. 2. First, the respective liquid handling process is described through at least one work step A. The process must implicitly or explicitly contain a definition of the formulation(s) to be implemented, which can be processed in one or more work steps A. In addition, further existing information is compiled, for example about the equipment used in each case, for example reservoirs 1 and pipetting tools 2. Such information is known per se and is taken into account according to the present disclosure in the form of at least one secondary condition N.

For the respective equipment, sufficiently accurate descriptions, for example, should be present with regard to the respective geometries, for example. For example, maximum volumes Vmax and/or dead volumes VT of the reservoirs 1 and/or working volumes VA and/or blowout volumes VBO of the pipetting tool(s) 2 should be known.

Furthermore, the relevant partial amounts T to be respectively transferred, or the partial volumes to be transferred, should be known sufficiently accurately. These can be ascertained in a first step on the basis of the predeterminable number of samples and/or the respective formulation. A net transfer volume of the substances S to be used in each case can also be determined in a similar manner.

Beyond the actual net transfer volume, however, further process-relevant volumes, such as blowout volumes VBO, overstroke volumes, or residual volumes, are to be taken into account. A residual volume is, for example, a volume of a substance S remaining in a reservoir 1 which is not to be further used/processed in the respective liquid handling process. A residual volume can be defined, for example, in deviation from the dead volume VT in order to achieve higher process reliability.

In addition, it may be advisable to estimate and take into account unintentional but nevertheless transferred secondary volumes, such as residues adhering to surfaces of the pipetting tool 2. Such secondary volumes can be added proportionately as a function of the net transfer volume and/or an immersion depth of the pipetting tool 2, especially, of the pipette tip 4, for example.

First, a first estimated value X1 for the starting amount M of the substance A is determined on the basis of the existing information. Then, a simulation SIM of at least one work step A of the liquid handling process is performed in which the estimated value X1 and the at least one secondary condition N are taken into account. An attempt is made on the basis of the simulation to ascertain an actual value X1$ist$ for the starting amount M.

If the simulation SIM cannot be completed, i.e., if no actual value X1$ist$ can be determined, a new, second estimated value X2 for the starting amount M of the substance S is determined and the simulation SIM is performed again on the basis of the new estimated value X2. One reason that the simulation cannot be completed is that the starting amount M of one of the substances S used was too small. In this case, a value which is greater than the first estimated value X1 (X2>X1) is selected for the new estimated value M2.

If an actual value X1$ist$ could be determined, a comparison of the actual value X1$ist$ with the estimated value X1 is performed. If the difference between the actual value X1$ist$ and the estimated value X1 is outside of a predeterminable tolerance range T, a new estimated value X2 is likewise determined which is larger or smaller than the previous estimated value X1, and the simulation is likewise performed again on the basis of the new, second estimated value X2.

On the other hand, if the difference between the actual value X1$ist$ and the estimated value X1 is within the predeterminable tolerance range T, the current estimated value is outputted as the starting amount M for the substance S.

FIGS. 3-5 each show a possible embodiment of the method according to the present disclosure for three different, likewise exemplary liquid handling processes.

The liquid handling process illustrated in FIG. 3 comprises a work step A which includes a transfer of a partial amount T of 200 µL of the substance S into the sample containers P1-PN. The transfer takes place using a pipetting tool 2 with eight pipetting channels 3 and using a pipetting tool 2 with a single pipetting channel 3, as shown in FIG. 3$a$. The multi-dispensing method is used as the pipetting method. The pipette tips 4 each have a working volume Va=1,000 µL. The blowout volume is VBO=50 µL and takes place into a waste container.

Overall, it is assumed for this example that 100 samples are to be provided (FIG. 3$b$). Accordingly, four times the partial amount T=200 µL plus the blowout volume VBO can be transferred in each pipetting channel 3.

For the work step A, two reservoirs 1$a$ and 1$b$ with a capacity of 150,000 µL and a dead volume of VT=275.0 µL are used. In the case of such a selection of the reservoirs 1$a$ and 1$b$, it already results from an estimation of the net transfer volume that two reservoirs 1$a$ and 1$b$ are required.

Figure 3A:
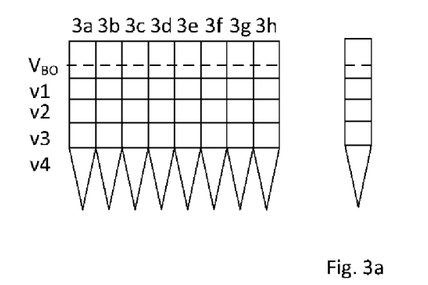
FIG. 3a shows schematically a pipetting tool used in the liquid handling process.
Figure 3B:
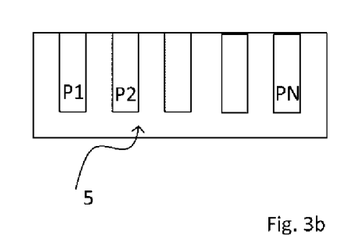
FIG. 3b shows schematically sample containers used in the liquid handling process.
Figure 3C:
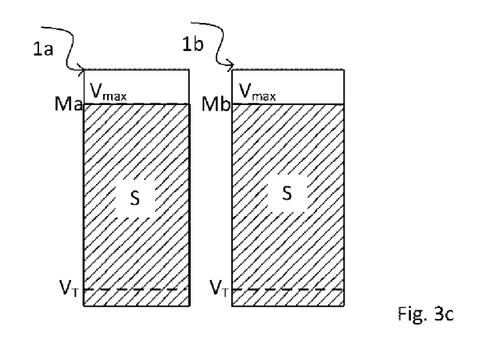
FIGS. 3c-3d show schematically the liquid reservoirs during the performance of the simulation.

As the first estimated value X1, it is assumed that both reservoirs are filled completely. Accordingly, the starting amount M is M=Ma+Mb=150,000 µL+150,000 µL=X1$a$+X1$b$=X1, as shown in FIG. 3$c$. The simulation SIM is then performed on the basis of the estimated value X1 and the secondary conditions N:

1. Transfer of 8×4×200.0 µL+VBO=8×50.0 µL from reservoir 1$a$,
2. Transfer of 8×4×200.0 µL+VBO=8×50.0 µL from reservoir 1$a$,
3. Transfer of 8×4×200.0 µL+VBO=8×50.0 µL from reservoir 1$b$, and
4. Transfer of 1×4×200.0 µL+VBO=1×50.0 µL from reservoir 1$a$.

After step 2, the residual volume remaining in the reservoir S1 is too small for a further receiving of 8×4×200.0 µL+VBO=8×50.0 µL from reservoir 1$a$, for which reason reservoirs 1$b$ are used. In the fourth step, furthermore, only one pipetting channel 3 is still required to provide the total of 100 samples.

Figure 3D:
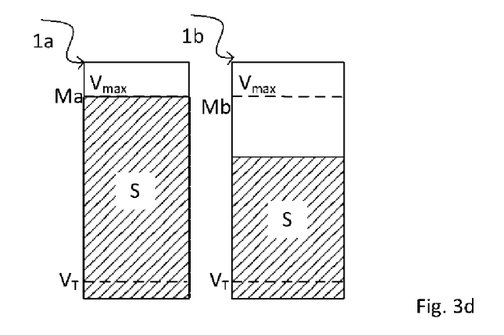

As the actual value X1$ist$ for the starting amount M of the substance S, the following results on the basis of the first simulation SIM: X1$ist$=X1$a$ist+X1$b$ist=14,450.0 µL+6,800.0 µL. The estimated value X1 is accordingly greater than the actual value X1$ist$. Therefore, a new estimated value X2<X1 is determined, where X2=X2$a$+X2$b$=14,450.0 µL+6,800.0 µL, cf. FIG. 3$d$. The simulation SIM is then performed again on the basis of the new estimated value X2:

1. Transfer of 8×4×200.0 µL+VBO=8×50.0 µL from reservoir 1$a$,
2. Transfer of 8×4×200.0 µL+VBO=8×50.0 µL from reservoir 1$a$,
3. Transfer of 8×4×200.0 µL+VBO=8×50.0 µL from reservoir 1$b$, and
4. Transfer of 1×4×200.0 µL+VBO=1×50.0 µL from reservoir 1$a$.

As the actual value X2$ist$ for the starting amount M of the substance S, the following results on the basis of the second simulation SIM: X2$ist$=X2$aist$+X2$bist$=14,450.0 µL+6,800.0 µL. The estimated value X2 is the same as the actual value X2$ist$. Thus, the difference between the new estimated value X2 and the corresponding actual value X2$ist$ is within a tolerance range, and the new, or second, estimated value X2 is outputted the starting amount M of the substance.

The liquid handling process illustrated in FIG. 4 comprises a transfer of two different partial amounts T1 and T2 of two different substances S1 and S2 into the sample containers P1-PN. The method can accordingly be described with reference to two work steps A1, A2. A first work step A1 comprises the transfer of the first partial amount T1 of the first substance S1 into the sample containers P1-PN, while a second work step A2 comprises the transfer of the second partial amount T2 of the second substance S2. In the present case, it is assumed that in each case a first partial amount T1=150 µL of the first substance S1 and a second partial amount T2=50 µL of the second substance are to be transferred.

As in the case of FIG. 3, the transfers are performed with one eight-channel and one single-channel pipetting tool 2, cf. FIG. 4$a$. In this case, however, the pipette tips 4 each have a working volume Va=250 µL and the multi-aspirate method is used as the pipetting method.

Overall, it is also assumed for this example that 100 samples are to be provided (FIG. 4$b$). Accordingly, a first partial amount T1 and a second partial amount T2 can be transferred in each pipetting channel 3.

By using the multi-aspirate method, the first A1 and the second work step A2 are combined into a single work step. For this purpose, as in the case of FIG. 3, reservoirs 1$a$-1$c$ each with a capacity of 150,000 µL and a dead volume of VT=275.0 µL are used. For this example as well, it already results from an estimation of the net transfer volume that two intermediate reservoirs 1$a$ and 1$b$ are required at least for the first intermediate ZP1. Thus, the first 1$a$ and the second reservoir 1$b$ contain the first substance S1 and the third reservoir 1$c$ contains the second substance S2.

Figure 4A:
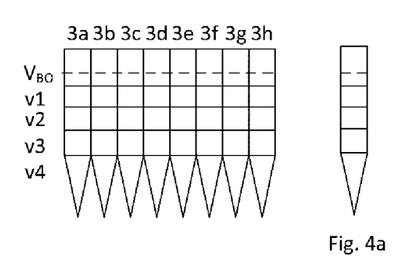
FIG. 4a shows schematically a pipetting tool used in the liquid handling process.
Figure 4B:
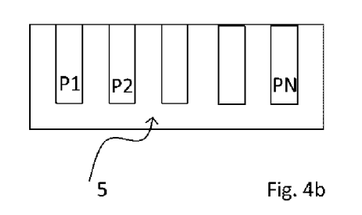
FIG. 4b shows schematically sample containers used in the liquid handling process.
Figure 4C:
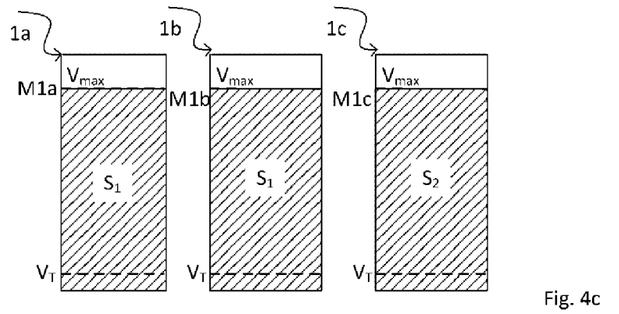
FIGS. 4c-4d show schematically the liquid reservoirs during the performance of the simulation.

As the first estimated value X1, it is again assumed that both reservoirs are filled completely. Thus, a first estimated value X1 for the starting amounts Ma-Mc can be calculated as M=Ma+Mb+Mc=+150,000 µL+150,000 µL+150,000 µL=X1$a$+X1$b$+X1$c$=X1, as shown in FIG. 4$c$. The simulation SIM is then performed on the basis of the estimated value X1 and the secondary conditions N:

1. Receiving 8×150.0 µL of the substance S1 from reservoir 1$a$,
2. Receiving 8×50.0 µL of the substance S2 from reservoir 1$c$,
3. Dispensing the reagent mixture into 8 samples,
4. Repeat steps 1 to 3 11 more times,
5. Receiving 4×150.0 µL of the substance S1 from reservoir 1$b$,
6. Receiving 4×50.0 µL of the substance S2 from reservoir 1$c$, and
7. Dispensing the reagent mixture into 4 samples.

For step 5, the residual volume remaining in the reservoir 1$a$ is too small for a further receiving of 4×150.0 µL from reservoir 1$a$, for which reason reservoirs 1$b$ are used.

Figure 4D:
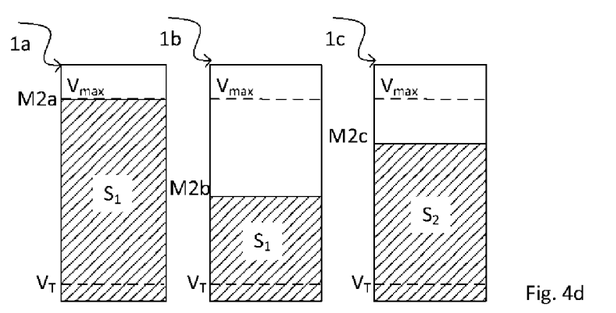

As the actual value X1$ist$ for the starting amounts Ma, Mb, and Mc of the substances S1 and S2, the following results on the basis of the first simulation SIM: X1$ist$=X1$aist$+X1$bist$+X1$cist$=14,400.0 µL+600.0 µL+5,000.0 µL. The estimated value X1 is accordingly greater than the actual value X1$ist$. Therefore, a new estimated value X2<X1 is determined, wherein X2=X2$a$+X2$b$+X2$c$=14,400.0 µL+600.0 µL+5,000.0 cf. FIG. 4$d$. The simulation SIM is then performed again on the basis of the new estimated value X2:

1. Receiving 8×150.0 µL of the substance S1 from reservoir 1$a$,
2. Receiving 8×50.0 µL of the substance S2 from reservoir 1$c$,
3. Dispensing the reagent mixture into 8 samples,
4. Repeat steps 1 to 3 11 more times,
5. Receiving 4×150.0 µL of the substance S1 from reservoir 1$b$,
6. Receiving 4×50.0 µL of the substance S2 from reservoir 1$c$, and
7. Dispensing the reagent mixture into 4 samples.

As the actual value X2$ist$ for the starting amounts M1$a$ and M1$b$ for the substance S1 and the starting amount M1$c$ for the substance S2, the following results on the basis of the second simulation SIM: X2$ist$=X2$aist$+X2$bist$=14,400.0 µL+600.0 µL+5,000.0 µL. The estimated value X2 is the same as the actual value X2$ist$. Thus, the difference between the new estimated value X2 and the corresponding actual value X2$ist$ is within a tolerance range, and the new, or second, estimated value X2 is outputted the starting amount M of the substance.

A third possible liquid handling process with three work steps A1-A3 is finally illustrated in FIG. 5. 100 samples are to be provided. A first partial amount T1=200 µL of a first intermediate ZP1 is to be supplied to each sample. The intermediate ZP1 is composed of a further intermediate ZP2 (30%) and a substance S1 (70%). The second intermediate ZP2 in turn consists of a second substance S2 (75%) and a third substance S3 (25%). The percentages in each case relate to the proportion of the substance/intermediate S/ZP contained in each case.

In the first work step A1, partial amounts T1 and T2 of the substances S2 and S3 are transferred into an intermediate reservoir 1$b$Z to form the intermediate ZP2. The transfer is performed by means of the single-dispensing method without blowout. The pipetting tool 2 has one channel and is used with a pipette tip 3 with a working volume Va of Va=1,000 µL.

In the second work step A2, partial amounts T3 and T4 of the substance S1 and the intermediate ZP2 are transferred into the intermediate reservoir 1$a$Z to form the intermediate ZP1. This transfer is also performed with the single-dispensing method without blowout. The pipetting tool 2 also has one channel and is used with a pipette tip 3 with a working volume Va of Va=1,000 µL.

In the third work step A3, a partial amount T5 of the intermediate ZP1 is lastly transferred in each case into a sample carrier (P1-PN). The transfer takes place here with one eight-channel and one single-channel pipetting tool 2 with pipette tips with a working volume Va of Va=1,000 µL.

The multi-dispensing method with a blowout of VBO=50 µL into a waste container is used.

Figure 5A:
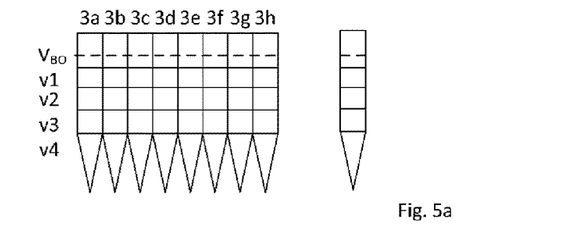
FIG. 5a shows schematically a pipetting tool used in the liquid handling process.
Figure 5B:
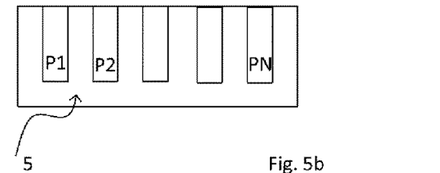
FIG. 5b shows schematically sample containers used in the liquid handling process.
Figure 5C:
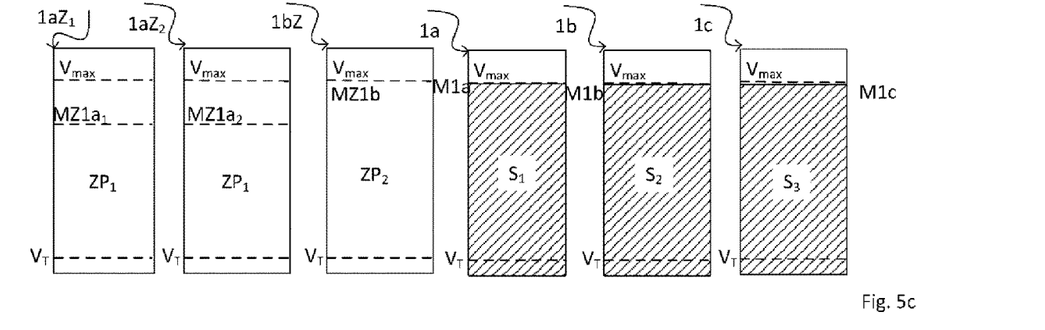
FIGS. 5c-5h show schematically the liquid reservoirs during the performance of the simulation.

As before, the pipetting tools 2 and the sample carrier 5 are shown in FIG. 5a and FIG. 5b. All the reservoirs 1a-1c and intermediate reservoirs 1aZ, 1bZ have a capacity of 15,000 µL and a dead volume of VT=275.0 µL. With a number of 100 samples, a net transfer volume of M=MZ1a+MZ1b+M1a+M1b+M1c=20,000 µL+6,000 µL+14,000 µL+4,500 µL+1,500 µL thus results for the estimated value X1 of the respective starting amounts M/MZ of the substances/intermediates S/ZP. Accordingly, two intermediate reservoirs MZ1a1 and MZ1a2 are required for the first intermediate ZP1, both of which are to contain the first intermediate ZP1 in equal proportions. This starting situation is also illustrated in FIG. 5c.

The dead volume VT is taken into account as a secondary condition N in each case. For the first simulation, it is furthermore assumed that the three reservoirs 1a-1c are each completely filled with the three substances S1-S3. The simulation SIM1 is then performed on the basis of the estimated value X1 and the secondary conditions N:

1. Transfer of 12×T1=937.5 µL (75%) of the substance S2 from reservoir 1b into the intermediate reservoir 1Zb [A1]
2. Transfer of 4×T2=937.5 µL (25%) of the substance S3 from reservoir 1c into the intermediate reservoir 1Zb [A1]
3. Transfer of 4×T3=788.8 µL (30%) of the intermediate ZP2 from intermediate reservoir MZ1b into each of the intermediate reservoirs 1aZ1 and 1aZ2 [A2]
4. Transfer of 8×T4=920.2 µL of the substance S1 from reservoir 1a into each of the intermediate reservoirs 1aZ1 and 1aZ2 [A2]
5. Transfer of 8×4×T5=200.0 µL+8×VBO=50.0 µL of the intermediate ZP1 from the intermediate reservoir 1aZ1 into the sample containers
6. Transfer of 8×4×T5=200.0 µL+8×VBO=50.0 µL of the intermediate ZP1 from the intermediate reservoir 1aZ2 into the sample containers
7. Termination of the simulation SIM1

Figure 5D:
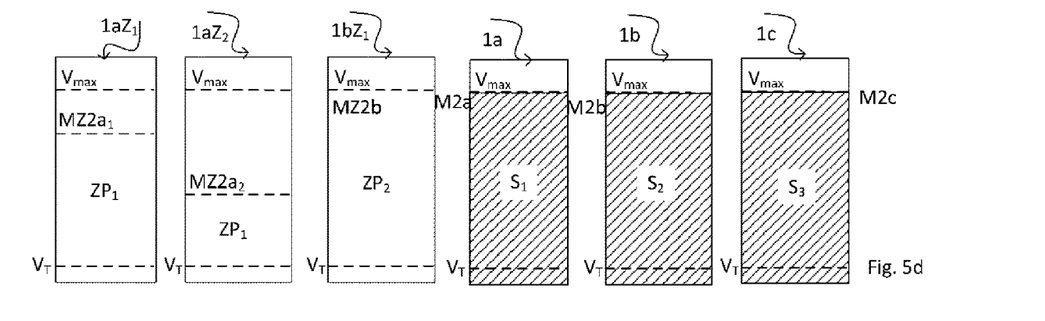

The simulation SIM1 cannot be completed. Too small a starting amount MZ1a of the intermediate ZP1 was provided, or the performed division of the starting amount MZ1 between the two intermediate reservoirs 1aZ1 and 1aZ2 is unfavorable since substance is only removed from a single container in each pipetting process. Therefore, for an additional simulation SIM2, the division of the first intermediate ZP1 between the two intermediate reservoirs 1aZ 1 and 1aZ2 is varied such that 3,348 µL of intermediate ZP1 is supplied from the second intermediate reservoir 1aZ2 to the first intermediate reservoir 1aZ1. This results in a net transfer volume of M=MZ1a1+MZ1a2+MZ1b+M1a+M1b+M1c=13,600 µL+6,884 µL+6,000 µL+14,000 µL+4,500 µL+1,500 µL. The simulation SIM2 is then carried out again, as illustrated in FIG. 5d:

1. Transfer of 12×T1=937.5 µL (75%) of the substance S2 from reservoir 1b into the intermediate reservoir 1bZ [A1]
2. Transfer of 4×T2=937.5 µL (25%) of the substance S3 from reservoir 1c into the intermediate reservoir 1bZ [A1]
3. Transfer of 5×T3=832.5 µL (30%) of the intermediate ZP2 from intermediate reservoir 1bZ into the intermediate reservoirs 1aZ1 [A2]
4. Transfer of 3×T3=715.9 µL (30%) of the intermediate ZP2 from intermediate reservoir 1bZ into the intermediate reservoirs 1aZ2 [A2]
5. Transfer of 10×T4=971.3 µL of the substance S1 from reservoir 1a into the intermediate reservoirs 1aZ1 [A2]
6. Transfer of 6×T4=835.2 µL of the substance S1 from reservoir 1a into the intermediate reservoirs 1aZ2 [A2]
7. Transfer of twice 8×4×T5=200.0 µL+8×VBO=50.0 µL of the intermediate ZP1 from the intermediate reservoir 1aZ1 into the sample containers
8. Transfer of 8×4×T5=200.0 µL+8×VBO=50.0 µL of the intermediate ZP1 from the intermediate reservoir 1aZ2 into the sample containers
9. Termination of the simulation SIM2

Figure 5E:
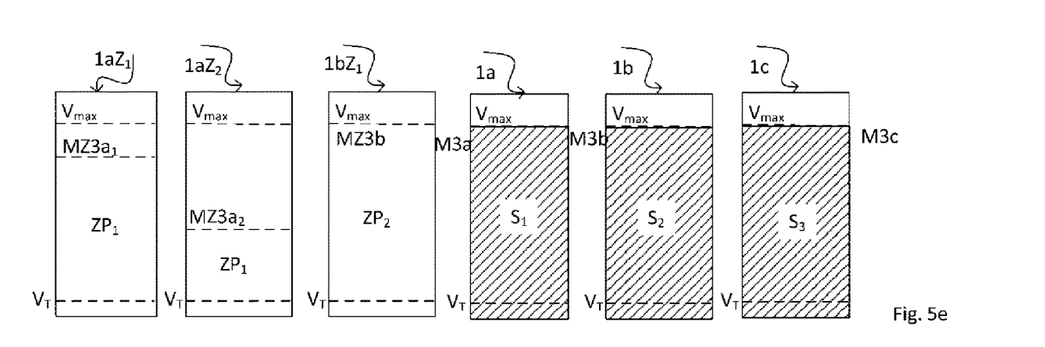

In the first or second intermediate reservoir 1aZ1 or 1aZ2, a volume of 850.0 µL is now missing. In addition, in the second intermediate reservoir 1aZ2, a residual volume of VR=84.0 µL remains. For yet another simulation SIM3, this residual volume VR is transferred into the first intermediate reservoir 1aZ1. In addition, an additional 766.0 µL is added to the starting amount MZ1a1 in the first intermediate reservoir 1aZ1. This results in a net transfer volume of M=MZ1a1+MZ1a2+MZ1b+M1a+M1b+M1c=14,450 µL+6,800 µL+6,000 µL+14,000 µL+4,500 µL+1,500 µL, as shown in FIG. 5e. The third simulation SIM3 then proceeds as follows:

1. Transfer of 12×T1=937.5 µL (75%) of the substance S2 from reservoir 1b into the intermediate reservoir 1bZ [A1]
2. Transfer of 4×T2=937.5 µL (25%) of the substance S3 from reservoir 1c into the intermediate reservoir 1bZ [A1]
3. Transfer of 5×T3=883.5 µL (30%) of the intermediate ZP2 from intermediate reservoir 1bZ into the intermediate reservoirs 1aZ1 [A2]
4. Transfer of 3×T3=707.5 µL (30%) of the intermediate ZP2 from intermediate reservoir 1bZ into the intermediate reservoirs 1aZ2 [A2]
5. Transfer of 11×T4=937.0 µL of the substance S1 from reservoir 1a into the intermediate reservoirs 1aZ1 [A2]
6. Termination of the simulation SIM3

Figure 5F:
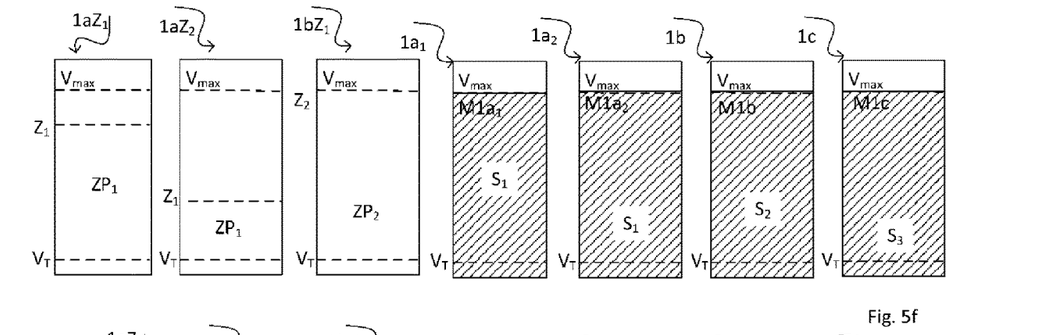
Figure 5G:
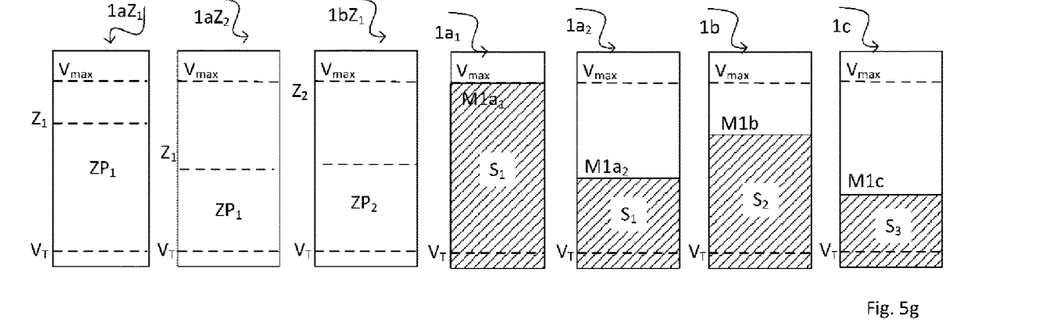
Figure 5H:
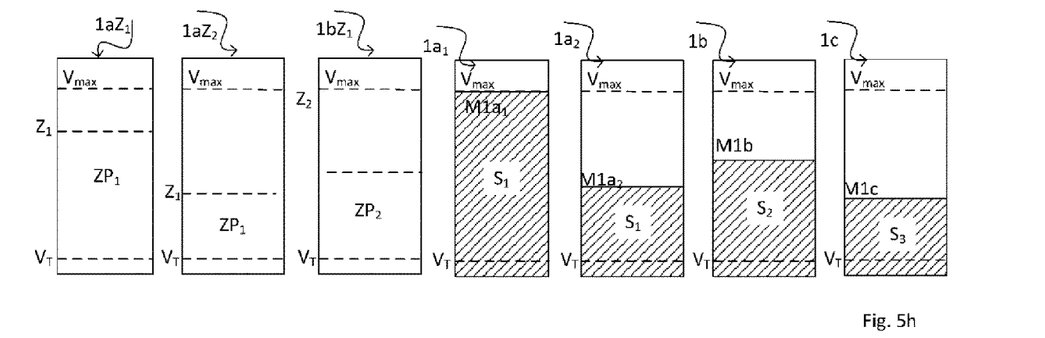

An additional 535.0 µL of the first substance S1 are required. Therefore, for a fourth simulation SIM4, a further reservoir 1a is added such that substance S1 is now located in the two reservoirs 1a1 and 1a2. First, both reservoirs 1a1 and 1a2 are completely filled, as illustrated in FIG. 5f. Thus, M=MZ1a1+MZ1a2+MZ1b+M1a1+M1a2+M1b+M1c=14,450 µL+6,800 µL+14,725 µL+14,725 µL+14,725 µL+14,725 µL+14,725 µL results for the net transfer volume, and for the fourth simulation SIM4:

1. Transfer of 12×T1=937.5 µL (75%) of the substance S2 from reservoir 1b into the intermediate reservoir 1bZ [A1]
2. Transfer of 4×T2=937.5 µL (25%) of the substance S3 from reservoir 1c into the intermediate reservoir 1bZ [A1]
3. Transfer of 5×T3=883.5 µL (30%) of the intermediate ZP2 from intermediate reservoir 1bZ into the intermediate reservoirs 1aZ1 [A2]
4. Transfer of 3×T3=707.5 µL (30%) of the intermediate ZP2 from intermediate reservoir 1bZ into the intermediate reservoirs 1aZ2 [A2]
5. Transfer of 11×T4=937.0 µL of the substance S1 from reservoir 1a into the intermediate reservoirs 1aZ1 [A2]
6. Transfer of 4×T4=990.5 µL of the substance S1 from reservoir 1a1 into the intermediate reservoirs 1aZ2 [A2]
7. Transfer of 3×T4=990.5 µL of the substance S1 from reservoir 1a2 into the intermediate reservoirs 1aZ2 [A2]
8. Transfer of twice 8×4×T5=200.0 µL+8×VBO=50.0 µL of the intermediate ZP1 from the intermediate reservoir 1aZ1 into the sample containers
9. Transfer of 8×4×T5=200.0 µL+8×VBO=50.0 µL of the intermediate ZP1 from the intermediate reservoir 1aZ2 into the sample containers
10. Transfer of 1×4×T5=200.0 µL+8×VBO=50.0 µL of the intermediate ZP1 from the intermediate reservoir 1aZ1 into the sample containers After completion of the samples, residual amounts remain in the respective reservoirs. In order to optimize the consumption of the individual reagents, the starting amounts are adjusted accordingly. Thus, M=MZ1a1+MZ1a2+MZ1b+M1a1+M1a2+M1b+M1c=14,450 µL+6,800 µL+6,540 µL+14,269 µL+2,971.5 µL+11,250 µL+3,750 µL results for the net transfer volume. A fifth simulation SIMS is performed on the basis of the new starting amounts:

1. Transfer of 6×T1=851.9 µL (75%) of the substance S2 from reservoir 1b into the intermediate reservoir 1bZ [A1]
2. Transfer of 2×T2=851.9 µL (25%) of the substance S3 from reservoir 1c into the intermediate reservoir 1bZ [A1]
3. Transfer of 5×T3=883.5 µL (30%) of the intermediate ZP2 from intermediate reservoir 1bZ into the intermediate reservoirs 1aZ1 [A2]
4. Transfer of 3×T3=707.5 µL (30%) of the intermediate ZP2 from intermediate reservoir 1bZ into the intermediate reservoirs 1aZ2 [A2]
5. Transfer of 11×T4=937.0 µL of the substance S1 from reservoir 1a into the intermediate reservoirs 1aZ1 [A2]
6. Transfer of 4×T4=990.5 µL of the substance S1 from reservoir 1a1 into the intermediate reservoirs 1aZ2 [A2]
7. Transfer of 3×T4=990.5 µL of the substance S1 from reservoir 1a2 into the intermediate reservoirs 1aZ2 [A2]
8. Transfer of twice 8×4×T5=200.0 µL+8×VBO=50.0 µL of the intermediate ZP1 from the intermediate reservoir 1aZ1 into the sample containers
9. Transfer of 8×4×T5=200.0 µL+8×VBO=50.0 µL of the intermediate ZP1 from the intermediate reservoir 1aZ2 into the sample containers
10. Transfer of 1×4×T5=200.0 µL+8×VBO=50.0 µL of the intermediate ZP1 from the intermediate reservoir 1aZ1 into the sample containers After completion of the samples, residual amounts of the substances S2 and S3 still remain in the reservoirs 1b and 1c. In order to further optimize the consumption of the individual reagents, the starting amounts are again adjusted such that M=MZ1a1$_1$+MZ1a2$_2$+MZ1b+M1a$_1$+M1a$_2$+M1b+M1c=14,450 µL+6,800 µL+6,540 µL+14,269 µL+2,971.5 µL+5,111.4 µL+1,703.8 µL results for the net transfer volume, as shown in FIG. 5h. The sixth simulation SIM 6 takes place analogously to the fifth simulation SIM5. After the sixth simulation SIM6, the deviations between the actual values X6$_{ist}$ for the respective starting amounts M/MZ of the substances S1-S3 and intermediates ZP1 and ZP2 are within the predefined tolerance range. Accordingly, the estimated values X6=XZ1a$_1$+XZ1a$_2$+XZ1b+X1a$_1$+X1a$_2$+X1b+X1c=MZ1a$_1$+MZ1a$_2$+MZ1b+M1a$_1$+M1a$_2$+M1b+M1c=M6 are outputted for the starting amounts M/MZ.

It should be noted that the examples shown here for liquid handling processes and the respective use of a method according to the present disclosure, especially, the respectively used starting amounts M/MZ of the substances/intermediates S/ZP, etc., are to be understood merely as examples. The present disclosure is in no way restricted to the processes mentioned, to the equipment 1, 2 selected by way of example, or to certain amounts of individual substances/intermediates S/ZP.

The invention claimed is:

1. A method for providing a predeterminable number of samples of a first substance in a liquid handling process, the method comprising:
describing the liquid handling process through at least one work step;
taking into account at least one secondary condition for the at least one work step;
determining an estimated value for a first starting amount of the first substance;
performing a simulation of the at least one work step of the liquid handling process on the basis of the estimated value and the at least one secondary condition;
determining a new estimated value for the first starting amount and re-performing the simulation of the at least one work step using the new estimated value when the simulation cannot be completed or when a deviation of an actual value ascertained on the basis of the simulation for the first starting amount of the first substance from the estimated value for the first starting amount of the first substance falls below or exceeds a predeterminable tolerance range, or outputting the actual value ascertained on the basis of the simulation as the first starting amount of the first substance; and
providing the first starting amount of the first substance; and
providing the predeterminable number of samples of the first substance from the first starting amount of the first substance.

2. The method according to claim 1,
wherein a first work step of the at least one work step includes a transfer of a first partial amount of the first substance from a first reservoir into an intermediate reservoir or into a sample container for receiving one of the predeterminable number of samples.

3. The method according to claim 1,
wherein a second work step of the at least one work step includes a transfer of a second partial amount of a second substance from a second reservoir into an intermediate reservoir or into a sample container for receiving one of the predeterminable number of samples, the method further comprising:
determining a second starting amount of the second substance which is required for providing the predeterminable number of samples;
providing the second starting amount of the second substance; and
transferring the second partial amount of the second substance from the second reservoir into the intermediate reservoir or into the sample container for receiving one of the predeterminable number of samples.

4. The method according to claim 3,
wherein the estimated value for the first starting amount of the first substance which is required for providing the predeterminable number of samples is ascertained, taking into account a correction factor, or taking into account at least one dead, residual, or maximum volume of at least one reservoir, intermediate reservoir, and/or container used.

5. The method according to claim 3,
wherein, in the event that a simulation cannot be completed, it is ascertained for which substance and/or for which intermediate too small a starting amount was provided.

6. The method according to claim 5,
wherein the new estimated value for the starting amount in the respective reservoir and/or intermediate reservoir is increased for the substance and/or for the intermediate for which too small a starting amount was provided, and/or wherein a further reservoir and/or intermediate reservoir with the substance and/or the intermediate is provided.

7. The method according to claim 3,
wherein the estimated value for the starting amount of the substance and/or the intermediate is reduced in the event that an actual value ascertained by means of a simulation for a starting amount of a substance and/or an intermediate is less/greater than the respective estimated value for the starting amount of the substance and/or of the intermediate.

8. The method according to claim 1,
wherein a third work step of the at least one work step includes a transfer of a first partial amount of the first substance and a transfer of a second partial amount of a second substance from at least one first and at least one second reservoir to produce a first intermediate in at least one first intermediate reservoir, the method further comprising:
determining a first and/or second starting amount of the first and/or second substance for producing a predeterminable amount of the intermediate and/or a first and/or a second starting amount of the first and/or the second substance which is required for providing the predetermined number of samples.

9. The method according to claim 8,
wherein a fourth work step of the at least one work step including a transfer of a partial amount of the first intermediate from the first intermediate reservoir into a second intermediate reservoir or a sample container for receiving one of the predeterminable number of samples, the method further comprising:
ascertaining a first starting amount of the first intermediate which is required for providing the predeterminable number of samples.

10. The method according to claim 9,
wherein at least one transfer of at least one substance or of at least one intermediate is performed with a pipetting process with at least one pipetting tool.

11. The method according to claim 10, further comprising:
selecting a number of pipetting channels of the pipetting tool as a function of the number of samples to be produced.

12. The method according to claim 11, further comprising:
ascertaining a number of pipette tips which are required for providing the predeterminable number of samples.

13. The method according to claim 12,
wherein the liquid handling process further includes returning at least a portion of at least one substance or one intermediate in the form of a blowout volume into the respective reservoir or the intermediate reservoir for the respective substance or the respective intermediate during a pipetting process, or wherein the blowout volume is discharged into a waste container, and
wherein the blowout volume is taken into account when ascertaining the estimated value for the respective starting amount of the substance or the intermediate.

14. The method according to claim 1,
wherein the at least one secondary condition of the at least one work step is a dead volume, a residual volume, or a maximum volume of a reservoir, an intermediate reservoir, and/or a container, a parameter of at least one pipetting tool used, including, a minimum or maximum working volume of a pipette tip or a blowout volume, a parameter of at least one pipetting method used, a specification with regard to a mechanical working range of at least one pipetting tool used, or information regarding an arrangement and/or number of the samples.

15. A computer program product with a computer program and at least one computer-readable non-transitory medium on which at least the computer program is at least partially stored, wherein the computer program is embodied to:
describe the liquid handling process through at least one work step;
take into account at least one secondary condition for the at least one work step;
determine an estimated value for the first starting amount of the first substance;
perform a simulation of the at least one work step of the liquid handling process on the basis of the estimated value and the at least one secondary condition; and
determine a new estimated value for the first starting amount and re-perform the simulation of the at least one work step using the new estimated value when the simulation cannot be completed or when a deviation of an actual value ascertained on the basis of the simulation for the first starting amount of the first substance from the estimated value for the first starting amount of the first substance falls below or exceeds a predeterminable tolerance range, or output the actual value ascertained on the basis of the simulation as the first starting amount of the first substance.

\* \* \* \* \*